United States Patent Office 2,771,436
Patented Nov. 20, 1956

2,771,436

PROCESS FOR BREAKING PETROLEUM EMULSIONS EMPLOYING CERTAIN POLYEPOXIDE TREATED AMINE-MODIFIED THERMOPLASTIC PHENOL-ALDEHYDE RESINS

Melvin De Groote, University City, and Kwan-Ting Shen, Brentwood, Mo., assignors to Petrolite Corporation, Wilmington, Del., a corporation of Delaware No Drawing. Application February 24, 1953,
Serial No. 338,574

20 Claims. (Cl. 252—338)

The present invention is a continuation-in-part of our co-pending application, Serial No. 305,079, filed August 18, 1952, now abandoned.

The present invention is concerned with demulsification which involves the use of certain polyepoxide-treated amine-modified thermoplastic phenol-aldehyde resins for the resolution of petroleum emulsions. More specifically, the invention of the present application relates to the breaking of emulsions of the water-in-oil type characterized by subjecting the emulsion to the action of a demulsifier including products obtained by the method of first condensing certain phenol-aldehyde resins, hereinafter described in detail, with a basic hydroxylated secondary monoamine, having not more than 32 carbon atoms in any group attached to the amino nitrogen atom, and formaldehyde, which condensation is followed by reaction of the resin condensate with certain phenolic polyepoxides, also hereinafter described in detail, and cogenerically associated compounds formed in the preparation of the polyepoxides.

In preparing diepoxides or the low molal polymers one does usually obtain cogeneric materials which may include monoepoxides. However, the cogeneric mixture is invariably characterized by the fact that there is on the average, based on the molecular weight, of course, more than one epoxide group per molecule.

A more limited aspect of the invention is represented by the use of the reaction product of (A) an amine-modified phenol-aldehyde resin condensate as described, and (B) a member of the class consisting of (1) compounds of the following formula

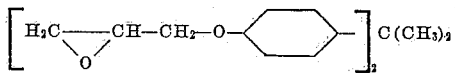

and (2) cogenerically associated compounds formed in the preparation of (1) preceding.

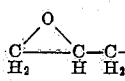

It so happens that the bulk of information concerned with the preparation of compounds having two oxirane rings appears in the patent literature and for the most part in the recent patent literature. Thus, in the subsequent text, there are numerous references to such patents for purpose of supplying information and also for purpose of brevity.

Notwithstanding the fact that subsequent data will be presented in considerable detail, yet the description becomes somewhat involved and certain facts should be kept in mind. The epoxides, and particularly the diepoxides may have no connecting bridge between the phenolic nuclei as in the case of a diphenyl derivative or may have a variety of connecting bridges, i. e., divalent linking radicals. Our preference is that either diphenyl compounds be employed or else compounds where the divalent link is obtained by the removal of a carbonyl oxygen atom as derived from a ketone or aldehyde.

If it were not for the expense involved in preparing and purifying the monomer we would prefer it to any other form, i. e., in preference to the polymer or mixture of polymer and monomer.

Stated another way, we would prefer to use materials of the kind described, for example, in U. S. Patent 2,530,353, dated November 14, 1950. Said patent describes compounds having the general formula

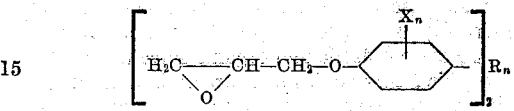

wherein R is an aliphatic hydrocarbon bridge, each $n$ independently has one of the values 0 and 1, and X is an alkyl radical containing from 1 to 4 carbon atoms.

The list of patents hereinafter referred to in the text as far as polyepoxide goes is as follows:

| U. S. Patent No. | Dated | Inventor |
|---|---|---|
| 2,122,958 | July 5, 1939 | Schafer. |
| 2,139,766 | December 13, 1938 | Mikeska et al. |
| 2,174,248 | September 26, 1939 | Do. |
| 2,195,539 | April 2, 1940 | Do. |
| 2,207,719 | July 16, 1940 | Cohen et al. |
| 2,244,021 | June 3, 1941 | Rosen et al. |
| 2,246,321 | June 17, 1941 | Rosen. |
| 2,285,563 | June 9, 1942 | Britton et al. |
| 2,331,448 | October 12, 1943 | Winning et al. |
| 2,430,002 | November 4, 1947 | De Groote et al. |
| 2,457,329 | December 28, 1948 | Swern et al. |
| 2,462,047 | February 15, 1949 | Wyler. |
| 2,462,048 | February 15, 1949 | Do. |
| 2,482,748 | September 27, 1949 | Dietzler. |
| 2,488,134 | November 15, 1949 | Mikeska et al. |
| 2,503,196 | April 4, 1950 | Dietzler et al. |
| 2,504,064 | April 11, 1950 | Bock et al. |
| 2,506,486 | May 2, 1950 | Bender et al. |
| 2,515,906 | July 18, 1950 | Stevens et al. |
| 2,515,907 | July 18, 1950 | Do. |
| 2,515,908 | July 18, 1950 | Do. |
| 2,526,545 | October 17, 1950 | Dietzler. |
| 2,530,353 | November 14, 1950 | Havens. |
| 2,564,191 | August 14, 1951 | De Groote et al. |
| 2,575,558 | November 20, 1951 | Newey et al. |
| 2,581,464 | January 8, 1952 | Zech. |
| 2,581,919 | January 8, 1952 | Albert. |
| 2,582,985 | January 22, 1952 | Greenlee. |

The compounds having two oxirane rings and employed for combination with the reactive amine-modified phenol-aldehyde resin condensates as herein described are compounds of the following formula and cogenerically associated compounds formed in their preparation:

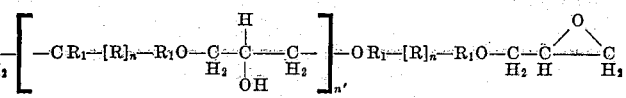

in which R represents a divalent radical selected from the class of ketone residues formed by the elimination of the ketonic oxygen atom and aldehyde residues obtained by the elimination of the aldehyde oxygen atom, the divalent radical

the divalent

radical, the divalent sulfone radical, and the divalent monosulfide radical —S—, the divalent radical

and the divalent disulfide radical —S—S—; and $R_1O$ is the divalent radical obtained by the elimination of a hydroxyl hydrogen atom and a nuclear hydrogen atom from the phenol

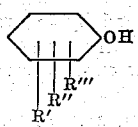

in which R', R" and R'" represent a member of the class of hydrogen and hydrocarbon substituents of the aromatic nucleus, said substituent member having not over 18 carbon atoms; $n$ represents an integer selected from the class of zero and 1, and $n'$ represents a whole number not greater than 3. The above mentioned compounds and those cogenerically associated compounds formed in their preparation are thermoplastic and organic solvent-soluble. Reference to being thermoplastic characterizes them as being liquids at ordinary temperature or readily convertible to liquids by merely heating below the point of pyrolysis and thus differentiates them from infusible

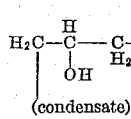 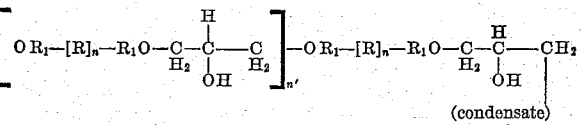

(condensate) (condensate)

resins. Reference to being soluble in an organic solvent means any of the usual organic solvents, such as alcohols, ketones, esters, ethers, mixed solvents, etc. Reference to solubility is merely to differentiate from a reactant which is not soluble and might be not only insoluble but also infusible. Furthermore, solubility is a factor insofar that it is sometimes desirable to dilute the compound containing the epoxy rings before reacting with amine. In such instances, of course, the solvent selected would have to be one which is not susceptible to oxyalkylation, as for example, kerosene, benzene, toluene, dioxane, various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring, i. e., the 1,2-epoxy ring. Furthermore, where a compound has two or more oxirane rings they will be referred to as polyepoxides. They usually represent, of course, 1,2-epoxide rings or oxirane rings in the alpha-omega position. This is a departure, of course, from the standpoint of strictly formal nomenclature as in the example of the simplest diepoxide which contains at least 4 carbon atoms and is formally described as 1,2-epoxy-3,4-epoxybutane (1,2-3,4 diepoxybutane).

It well may be that even though the previously suggested formula represents the principal component, or components, of the resultant or reaction product described in the previous text, it may be important to note that somewhat similar compounds, generally of much higher molecular weight, have been described as complex resinous epoxides which are polyether derivatives of polyhydric phenols containing an average of more than one epoxide group per molecule and free from functional groups other than epoxide and hydroxyl groups. See U. S. Patent No. 2,494,295, dated January 10, 1950, to Greenlee. The compounds here included are limited to the monomers or the low molal members of such series and generally contain two epoxide rings per molecule and may be entirely free from a hydroxyl group. This is important because the instant invention is directed towards products which are not insoluble resins and have certain solubility characteristics not inherent in the usual thermosetting resins. Note, for example, that said U. S. Patent No. 2,494,295 describes products wherein the epoxide derivative can combine with a sulfonamide resin. The intention in said U. S. Patent 2,494,295, of course, is to obtain ultimately a suitable resinous product having the characteristics of a comparatively insoluble resin.

Having obtained a reactant having generally 2 epoxy rings as depicted in the last formula preceding, or low molal polymers thereof, it becomes obvious the reaction can take place with any amine-modified phenol-aldehyde resin by virtue of the fact that there is always present reactive hydroxyl groups which are part of the phenolic nuclei and there may be present reactive hydrogen atoms attached to a nitrogen atom, or an oxygen atom, depending on the presence of a hydroxylated group or secondary amino group.

To illustrate the products which represent the subject matter of the present invention reference will be made to a reaction involving a mole of the oxyalkylating agent, i. e., the compound having two oxirane rings and a condensate. Proceeding with the example previously described it is obvious the reaction ratio of two moles of the amine condensate to one mole of the oxyalkylating agent gives a product which may be indicated as follows:

in which the various characters have their previous significance and the characterization "condensate" is simply an abbreviation for the condensate which is described in greater detail subsequently.

Such final product in turn also must be soluble but solubility is not limited to an organic solvent but may include water, or for that matter, a solution of water containing an acid such as hydrochloric acid, acetic acid, hydroxyacetic acid, etc. In other words, the nitrogen groups present, whether two or more, may or may not be significantly basic and it is immaterial whether aqueous solubility represents an anhydro base or the free base (combination with water) or a salt form such as the acetate, chloride, etc. The purpose in this instance is to differentiate from insoluble resinous materials, particularly those resulting from gelation or cross-linking. Not only does this property serve to differentiate from instances where an insoluble material is desired, but also serves to emphasize the fact that in many instances the preferred compounds have distinct water-solubility or are distinctly dispersible in 5% gluconic acid. For instance, the products freed from any solvent can be shaken with 5 to 20 times their weight of distilled water at ordinary temperature and show at least some tendency towards being self-dispersing. The solvent which is generally tried is xylene. If xylene alone does not serve then a mixture of xylene and methanol, for instance, 80 parts of xylene and 20 parts of methanol, or 70 parts of xylene and 30 parts of methanol can be used. Sometimes it is desirable to add a small amount of acetone to the xylene-methanol mixture, for instance, 5% to 10% of acetone.

The polyepoxide treated condensates obtained in the manner described are, in turn, oxyalkylation-susceptible and valuable derivatives can be obtained by further reaction with ethylene oxide, propylene oxide, ethylene imine, etc.

Similarly, the polyepoxide-derived compounds can be reacted with a product having both a nitrogen group and a 1,2-epoxy group, such as 3-dialkylaminoepoxypropane. See U. S. Patent No. 2,520,093 dated August 22, 1950, to Gross.

As far as the use of the herein described products goes for purpose of resolution of petroleum emulsions of the water-in-oil type, we particularly prefer to use those which as such or in the form of the free base or hydrate, i. e., combination with water or particularly in the form of a low molal organic acid salt such as the gluconates or the acetate or hydroxy acetate, have sufficiently hydrophile character to at least meet the test set forth in U. S. Patent No. 2,499,368, dated March 7, 1950, to De Groote et al. In said patent such test for emulsification using a water-insoluble solvent, generally xylene, is described as an index of surface activity.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

For purpose of convenience what is said hereinafter will be divided into eight parts with Part 3, in turn, being divided into three subdivisions:

Part 1 is concerned with our preference in regard to the polyepoxide and particularly the diepoxide reactant;

Part 2 is concerned with certain theoretical aspects of diepoxide preparation;

Part 3, Subdivision A, is concerned with the preparation of monomeric diepoxides, including Table I;

Part 3, Subdivision B, is concerned with the preparation of low molal polymeric exopides or mixtures containing low molal polymeric epoxides as well as the monomer and includes Table II;

Part 3, Subdivision C, is concerned with miscellaneous phenolic reactants suitable for diepoxide preparation;

Part 4 is concerned with the phenol-aldehyde resin which is subjected to modification by condensation reaction to yield the amine-modified resin;

Part 5 is concerned with appropriate basic hydroxylated secondary amines which may be employed in the preparation of the herein-described amine - modified resins;

Part 6 is concerned with reactions involving the resin, the amine, and formaldehyde to produce specific products or compounds which are then subjected to reaction with polyepoxides;

Part 7 is concerned with the reactions involving the two preceding types of materials and examples obtained by such reaction. Generally speaking, this involves nothing more than a reaction between 2 moles of a previously prepared amine-modified phenol-aldehyde resin condensate as described, and one mole of a polyepoxide so as to yield a new and larger resin molecule, or comparable product;

Part 8 is concerned with the resolution fo petroleum emulsions of the water-in-oil type by means of the previously described chemical compounds or reaction products.

PART 1

As will be pointed out subsequently, the preparation of polyepoxides may include the formation of a small amount of material having more than two epoxide groups per molecule. If such compounds are formed they are perfectly suitable except to the extent they may tend to produce ultimate reaction products which are not solvent-soluble liquids or low-melting solids. Indeed, they tend to form thermosetting resins or insoluble materials. Thus, the specific objective by and large is to produce diepoxides as free as possible from any monoepoxides and as free as possible from polyepoxides in which there are more than two epoxide groups per molecule. Thus, for practical purposes what is said hereinafter is largely limited to polyepoxides in the form of diepoxides.

As has been pointed out previously one of the reactants employed is a diepoxide reactant. It is generally obtained from phenol (hydroxybenzene) or substituted phenol. The ordinary or conventional manufacture of the epoxides usually results in the formation of a cogeneric mixture as explained subsequently. Preparation of the monomer or separation of the monomer from the remaining mass of the co-generic mixture is usually expensive. If monomers were available commercially at low cost, or if they could be prepared without added expense for separation, our preference would be to use the monomer. Certain monomers have been prepared and described in the literature and will be referred to subsequently. However, from a practical standpoint one must weigh the advantage, if any, that the monomer has over other low molal polymers from a cost standpoint; thus, we have found that one might as well attempt to prepare a monomer and fully recognize that there may be present, and probably invariably are present, other low molal polymers in comparatively small amounts. Thus, the materials which are most apt to be used for practical reasons are either monomers with some small amounts of polymers present or mixtures which have a substantial amount of polymers present. Indeed, the mixture can be prepared free from monmers and still be satisfactory. Briefly, then, our preference is to use the monomer or the monomer with the minimum amount of higher polymers.

It has been pointed out previously that the phenolic nuclei in the epoxide reactant may be directly united, or united through a variety of divalent radicals. Actually, it is our preference to use those which are commercially available and for most practical purposes it means instances where the phenolic nuclei are either united directly without any intervening linking radical, or else united by a ketone residue or formaldehyde residue. The commercial bis-phenols available now in the open market illustrate one class. The diphenyl derivatives illustrate a second class, and the materials obtained by reacting substituted monofunctional phenols with an aldehyde illustrate the third class. All the various known classes may be used but our preference rests with these classes due to their availability and ease of preparation, and also due to the fact that the cost is lower than in other examples.

Although the diepoxide reactants can be produced in more than one way, as pointed out elsewhere, our preference is to produce them by means of the epichlorohydrin reaction referred to in detail subsequently.

One epoxide which can be purchased in the open market and contains only a modest amount of polymers corresponds to the derivative of bis-phenol A. It can be used as such, or the monomer can be separated by an added step which involves additional expense. This compound of the following structure is preferred as the epoxide reactant and will be used for illustration repeatedly with the full understanding that any of the other epoxides described are equally satisfactory, or that the higher polymers are satisfactory, or that mixtures of the monomer and higher polymers are satisfactory. The formula for this compound is

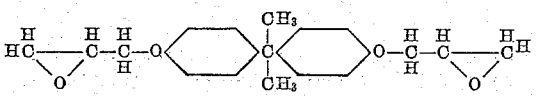

Reference has just been made to bis-phenol A and a suitable epoxide derived therefrom. Bis-phenol A is dihydroxy-diphenyldimethyl methane, with the 4,4' isomers predominating and with lesser quantities of the 2,2' and 4,2' isomers being present. It is immaterial which one of these isomers is used and the commercially available mixture is entirely satisfactory.

Attention is again directed to the fact that in the instant part, to wit, Part 1, and in succeeding parts, the text is concerned almost entirely with epoxides in which there is no bridging radical or the bridging radical is derived from an aldehyde or a ketone. It would be immaterial if the divalent linking radical would be derived from the other groups illustrated for the reason that nothing more than mere substitution of one compound for the other would be required. Thus, what is said hereinafter, although directed to one class or a few classes, applies with equal force and effect to the other classes of epoxide reactants.

If sulfur-containing compounds are prepared they should be freed from impurities with considerable care for the reason that any time that a low-molal sulfur-containing compound can react with epichlorohydrin there may be formed a by-product in which the chlorine happened to be particularly reactive and may represent a product, or a mixture of products, which would be unusually toxic, even though in comparatively small concentration.

PART 2

The polyepoxides and particularly the diepoxides can be derived by more than one method as, for example, the use of epichlorohydrin or glycerol dichlorohydrin. If a product such as bis-phenol A is employed the ultimate compound in monomeric form employed as a reactant in the present invention has the following structure:

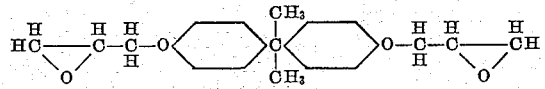

Treatment with epichlorohydrin, for example, does not yield this product initially but there is an intermediate produced which can be indicated by the following structure:

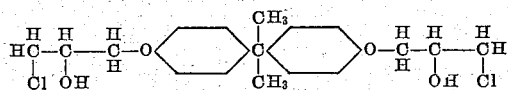

Treatment with alkali, of course, forms the epoxy ring. A number of problems are involved in attempting to produce this compound free from cogeneric materials of related composition. The difficulty stems from a number of sources and a few of the more important ones are as follows:

(1) The closing of the epoxy ring involves the use of caustic soda or the like which, in turn, is an effective catalyst in causing the ring to open in an oxyalkylation reaction.

Actually, what may happen for any one of a number of reasons is that one obtains a product in which there is only one epoxide ring and there may, as a matter of fact, be more than one hydroxyl radical as illustrated by the following compounds:

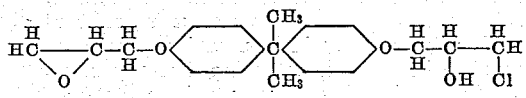

or

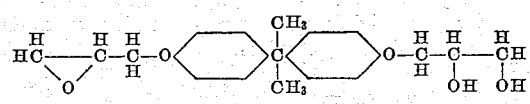

(2) Even if one starts with the reactants in the preferred ratio, to wit, two parts of epichlorohydrin to one part of bis-phenol A, they do not necessarily so react and as a result one may obtain products in which more than two epichlorohydrin residues become attached to a single bis-phenol A nucleus by virtue of the reactive hydroxyls present which enter into oxyalkylation reactions rather than ring closure reactions.

(3) As is well known, ethylene oxide in the presence of alkali, and for that matter in the complete absence of water, forms cyclic polymers. Indeed, ethylene oxide can produce a solid polymer. This same reaction can, and at times apparently does, take place in connection with compounds having one, or in the present instance, two substituted oxirane rings, i. e., substituted 1,2 epoxy rings. Thus, in many ways it is easier to produce a polymer, particularly a mixture of the monomer, dimer and trimer, than it is to produce the monomer alone.

(4) As has been pointed out previously, monoepoxides may be present and, indeed, are almost invariably and inevitably present when one attempts to produce polyepoxides, and particularly diepoxides. The reason is the one which has been indicated previously, together with the fact that in the ordinary course of reaction a diepoxide, such as

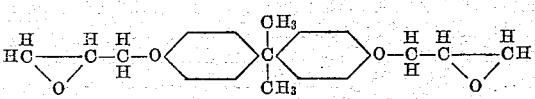

may react with a mole of bis-phenol A to give a monoepoxy structure. Indeed, in the subsequent text immediately following reference is made to the dimers, trimers and tetramers in which two epoxide groups are present. Needless to say, compounds can be formed which correspond in every respect except that one terminal epoxide group is absent and in its place is a group having one chlorine atom and one hydroxyl group, or else two hydroxyl groups, or an unreacted phenolic ring.

(5) Some reference has been made to the presence of a chlorine atom and although all effort is directed towards the elimination of any chlorine-containing molecule yet it is apparent that this is often an ideal approach rather than a practical possibility. Indeed, the same sort of reactants are sometimes employed to obtain products in which intentionally there are both an epoxide group and a chlorine atom present. See U. S. Patent No. 2,581,464, dated January 8, 1952, to Zech.

What has been said in regard to the theoretical aspect is, of course, closely related to the actual method of preparation which is discussed in greater detail in Part 3, particularly subdivisions A and B. There can be no clear line between the theoretical aspect and actual preparative steps. However, in order to summarize or illustrate what has been said in Part 1, immediately preceding reference will be made to a typical example which already has been employed for purpose of illustration. The particular example is

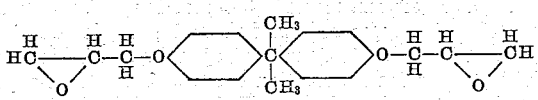

It is obvious that two moles of such material combine readily with one mole of bis-phenol A,

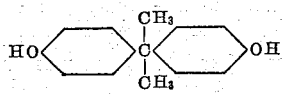

to produce the product which is one step further along, at least, towards polymerization. In other words, one prior example shows the reaction product obtained from one mole of the bisphenol A and two moles of epichlorohydrin. This product in turn would represent three moles of bisphenol A and four moles of epichlorohydrin.

For purpose of brevity, without going any further, the next formula is in essence one which, perhaps in an idealized way, establishes the composition of resinous products available under the name of Epon Resins as now sold in the open market. See, also, chemical pamphlet entitled "Epon Surface-Coating Resins," Shell Chemical Corporation, New York city. The word "Epon" is a registered trademark of the Shell Chemical Corporation.

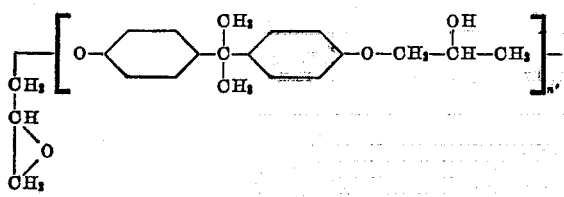
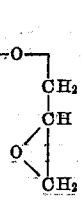

For the purpose of the instant invention, $n'$ may represent a number including zero, and at the most a low number such as 1, 2 or 3. This limitation does not exist in actual efforts to obtain resins as differentiated from the herein described soluble materials. It is quite probable that in the resinous products as marketed for coating use the value of $n'$ is usually substantially higher. Note again what has been said previously that any formula is, at best, an over-simplification, or at the most represents perhaps only the more important or principal constituent or constituents. These materials may vary from simple non-resinous to complex resinous epoxides which are polyether derivatives of polyhydric phenols containing an average of more than one epoxide group per molecule and free from functional groups other than epoxide and hydroxyl groups.

Referring now to what has been said previously, to wit, compounds having both an epoxy ring or the equivalent and also a hydroxyl group, one need go no further than to consider the reaction product of

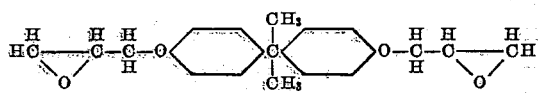

and bisphenol A in a mole-for-mole ratio, since the initial reactant would yield a product having an unreacted epoxy ring and two reactive hydroxyl radicals. Referring again to a previous formula, consider an example where two moles of bisphenol A have been reacted with 3 moles of epichlorohydrin. The simplest compound formed would be thus:

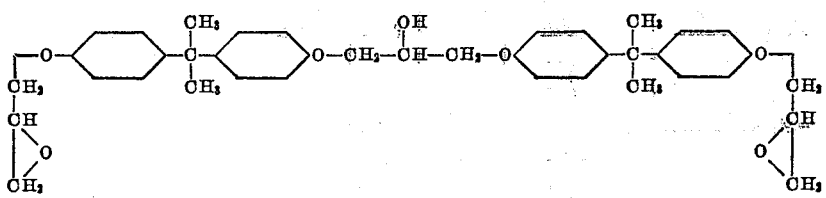

Such a compound is comparable to other compounds having both the hydroxyl and epoxy ring such as 9,10-epoxy octadecanol. The ease with which this type of compound polymerizes is pointed out by U. S. Patent No. 2,457,329, dated December 28, 1948, to Swern et al.

The same difficulty which involves the tendency to polymerize on the part of compounds having a reactive ring and a hydroxyl radical may be illustrated by compounds where, instead of the oxirane ring (1,2-epoxy ring) there is present a 1,3-epoxy ring. Such compounds are derivatives of trimethylene oxide rather than ethylene oxide. See U. S. Patents Nos. 2,462,047 and 2,462,048, both dated February 15, 1949, to Wyler.

At the expense of repetition of what appeared previously, it may be well to recall that these materials may vary from simple soluble non-resinous to complex non-soluble resinous epoxides which are polyether derivatives of polyhydric phenols containing an average of more than one epoxide group per molecule and free from functional groups other than epoxide and hydroxyl groups. The former are here included, but the latter, i. e., highly resinous or insoluble types, are not.

In summary then in light of what has been said, compounds suitable for reaction with amines may be summarized by the following formula:

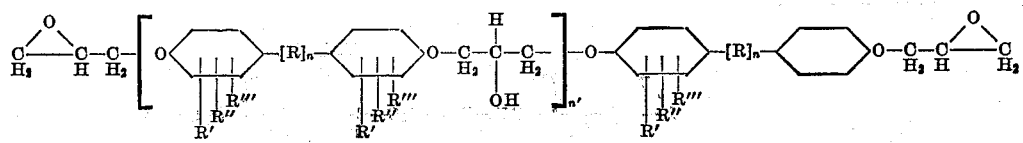

or for greater simplicity the formula could be restated thus:

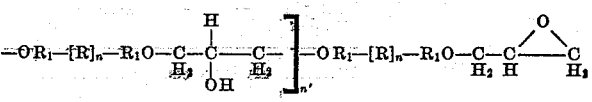

in which the various characters have their prior significance and in which $R_1O$ is the divalent radical obtained by the elimination of a hydroxyl hydrogen atom and a nuclear hydrogen atom from the phenol in which $R'$, $R''$, and $R'''$ represent a member of the class consisting of hydrogen and hydrocarbon substituents of the aromatic nucleus, said substituent member having not over 18 carbon atoms; $n$ represents an integer selected from the class of zero and 1, and $n'$ represents a whole number not greater than 3.

PART 3

Subdivision A

The preparations of the diepoxy derivatives of the diphenols, which are sometimes referred to as diglycidyl ethers, have been described in a number of patents. For convenience, reference will be made to two only, to wit, aforementioned U. S. Patent 2,506,486, and aforementioned U. S. Patent No. 2,530,353.

Purely by way of illustration, the following diepoxides, or diglycidyl ethers as they are sometimes termed, are included for purpose of illustration. These particular compounds are described in the two patents just mentioned.

TABLE I

| Example number | Diphenol | Diglycidyl ether | Patent reference |
|---|---|---|---|
| 1A | $CH_2(C_6H_4OH)_2$ | Di(epoxypropoxyphenyl)methane | 2,506,486 |
| 2A | $CH_3CH(C_6H_4OH)_2$ | Di(epoxypropoxyphenyl)methylmethane | 2,506,486 |
| 3A | $(CH_3)_2C(C_6H_4OH)_2$ | Di(epoxypropoxyphenyl)dimethylmethane | 2,506,486 |
| 4A | $C_2H_5C(CH_3)(C_6H_4OH)_2$ | Di(epoxypropoxyphenyl)ethylmethylmethane | 2,506,486 |
| 5A | $(C_2H_5)_2C(C_6H_4OH)_2$ | Di(epoxypropoxyphenyl)diethylmethane | 2,506,486 |
| 6A | $CH_3C(C_3H_7)(C_6H_4OH)_2$ | Di(epoxypropoxyphenyl)methylpropylmethane | 2,506,486 |
| 7A | $CH_3C(C_6H_5)(C_6H_4OH)_2$ | Di(epoxypropoxyphenyl)methylphenylmethane | 2,506,486 |
| 8A | $C_2H_5C(C_6H_5)(C_6H_4OH)_2$ | Di(epoxypropoxyphenyl)ethylphenylmethane | 2,506,486 |
| 9A | $C_3H_7C(C_6H_5)(C_6H_4OH)_2$ | Di(epoxypropoxyphenyl)propylphenylmethane | 2,506,486 |
| 10A | $C_4H_9C(C_6H_5)(C_6H_4OH)_2$ | Di(epoxypropoxyphenyl)butylphenylmethane | 2,506,486 |
| 11A | $(CH_3C_6H_4)CH(C_6H_4OH)_2$ | Di(epoxypropoxyphenyl)tolylmethane | 2,506,486 |
| 12A | $(CH_3C_6H_4)C(CH_3)(C_6H_4OH)_2$ | Di(epoxypropoxyphenyl)tolylmethylmethane | 2,506,486 |
| 13A | Dihydroxy diphenyl | 4,4'-bis(2,3-epoxypropoxy)diphenyl | 2,530,353 |
| 14A | $(CH_3)C(C_4H_9\cdot C_6H_3OH)_2$ | 2,2-bis(4-(2,3-epoxypropoxy)2-tertiarybutyl phenyl)propane | 2,530,353 |

Subdivision B

As to the preparation of low-molal polymeric epoxides or mixtures reference is made to numerous patents and particularly the aforementioned U. S. Patents Nos. 2,575,558 and 2,582,985.

In light of the aforementioned U. S. Patent No. 2,575,558, the following examples can be specified by reference to the formula therein provided one still bears in mind that it is in essence an over-simplification.

TABLE II

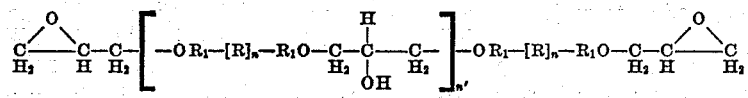

(in which the characters have their previous significance)

| Example number | —$R_1O$— from $HR_1OH$ | —R— | $n$ | $n'$ | Remarks |
|---|---|---|---|---|---|
| B1 | Hydroxy benzene | $CH_3$<br>—C—<br>$CH_3$ | 1 | 0, 1, 2 | Phenol known as bis-phenol A. Low polymeric mixture about ⅔ or more where $n'=0$, remainder largely where $n'=1$, some where $n'=2$. |
| B2 | ...do... | $CH_3$<br>—C—<br>$CH_2$<br>$CH_3$ | 1 | 0, 1, 2 | Phenol known as bis-phenol B. See note regarding B1 above. |
| B3 | Orthobutylphenol | $CH_3$<br>—C—<br>$CH_3$ | 1 | 0, 1, 2 | Even though $n'$ is preferably 0, yet the usual reaction product might well contain materials where $n'$ is 1, or to a lesser degree 2. |
| B4 | Orthoamylphenol | $CH_3$<br>—C—<br>$CH_3$ | 1 | 0, 1, 2 | Do. |
| B5 | Orthooctylphenol | $CH_3$<br>—C—<br>$CH_3$ | 1 | 0, 1, 2 | Do. |
| B6 | Orthononylphenol | $CH_3$<br>—C—<br>$CH_3$ | 1 | 0, 1, 2 | Do. |
| B7 | Orthododecylphenol | $CH_3$<br>—C—<br>$CH_3$ | 1 | 0, 1, 2 | Do. |
| B8 | Metacresol | $CH_3$<br>—C—<br>$CH_3$ | 1 | 0, 1, 2 | See prior note. This phenol used as initial material is known as bis-phenol C. For other suitable bis-phenols see U. S. Patent 2,564,191. |
| B9 | ...do... | $CH_3$<br>—C—<br>$CH_2$<br>$CH_3$ | 1 | 0, 1, 2 | See prior note. |
| B10 | Dibutyl (ortho-para) phenol | H<br>—C—<br>H | 1 | 0, 1, 2 | Do. |

TABLE II (continued)

| Example number | —R₁O— from HR₁OH | —R— | $n$ | $n'$ | Remarks |
|---|---|---|---|---|---|
| B11 | Diamyl (ortho-para) phenol | H—C—H | 1 | 0, 1, 2 | See prior note. |
| B12 | Dioctyl (ortho-para) phenol | H—C—H | 1 | 0, 1, 2 | Do. |
| B13 | Dinonyl (ortho-para) phenol | H—C—H | 1 | 0, 1, 2 | Do. |
| B14 | Diamyl (ortho-para) phenol | H—C—CH₃ | 1 | 0, 1, 2 | Do. |
| B15 | ...do... | H—C—C₂H₅ | 1 | 0, 1, 2 | Do. |
| B16 | Hydroxy benzene | O=S=O | 1 | 0, 1, 2 | Do. |
| B17 | Diamyl phenol (ortho-para) | —S—S— | 1 | 0, 1, 2 | Do. |
| B18 | ...do... | —S— | 1 | 0, 1, 2 | Do. |
| B19 | Dibutyl phenol (ortho-para) | H H —C—C— H H | 1 | 0, 1, 2 | Do. |
| B20 | ...do... | H H —C—C— H H | 1 | 0, 1, 2 | Do. |
| B21 | Dinonylphenol (ortho-para) | H H —C—C— H H | 1 | 0, 1, 2 | Do. |
| B22 | Hydroxy benzene | O=C | 1 | 0, 1, 2 | Do. |
| B23 | ...do... | None | 0 | 0, 1, 2 | Do. |
| B24 | Ortho-isopropyl phenol | CH₃—C—CH₃ | 1 | 0, 1, 2 | See prior note. As to preparation of 4,4'-isopropylidene bis-(2-isopropylphenol) see U. S. Patent No. 2,482,748, dated Sept. 27, 1949, to Dietzler. |
| B25 | Para-octyl phenol | —CH₂—S—CH₂— | 1 | 0, 1, 2 | See prior note. (As to preparation of the phenol sulfide see U. S. Patent No. 2,488,134, dated Nov. 15, 1949, to Mikeska et al.) |
| B26 | Hydroxybenzene | CH₃—C—CH₂—O—C₂H₅ | 1 | 0, 1, 2 | See prior note. (As to preparation of the phenol sulfide see U. S. Patent No. 2,526,545.) |

Subdivision C

The prior examples have been limited largely to those in which there is no divalent linking radical, as in the case of diphenyl compounds, or where the linking radical is derived from a ketone or aldehyde, particularly a ketone. Needless to say, the same procedure is employed in converting diphenyl into a diglycidyl ether regardless of the nature of the bond between the two phenolic nuclei. For purpose of illustration attention is directed to numerous other diphenols which can be readily converted to a suitable polyepoxide, and particularly diepoxide, reactant.

As previously pointed out the initial phenol may be substituted, and the substituent group in turn may be a cyclic group such as the phenyl group or cyclohexyl group as in the instance of cyclohexylphenol or phenylphenol. Such substituents are usually in the ortho position and may be illustrated by a phenol of the following composition:

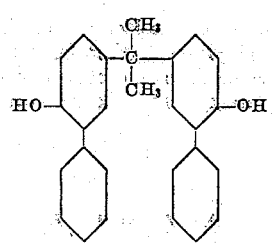

Similar phenols which are monofunctional, for instance, paraphenyl phenol or paracyclohexyl phenol with an additional substituent in the ortho position, may be employed in reactions previously referred to, for instance, with formaldehyde or sulfur chlorides to give comparable phenolic compounds having 2 hydroxyls and suitable for subsequent reaction with epichlorohydrin, etc.

Other samples include:

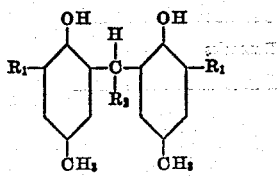

wherein R₁ is a substituent selected from the class consisting of secondary butyl and tertiary butyl groups and R₂ is a substituent selected from the class consisting of alkyl, cycloalkyl, aryl, aralkyl, and alkaryl groups, and wherein said alkyl group contains at least 3 carbon atoms. See U. S. Patent No. 2,515,907.

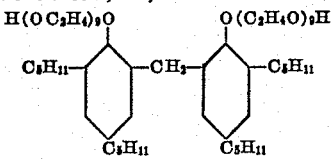

in which the —C₅H₁₁ groups are secondary amyl groups. See U. S. Patent No. 2,504,064.

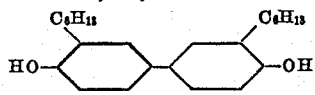

See U. S. Patent No. 2,285,563.

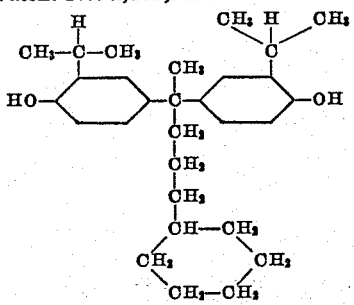

See U. S. Patent No. 2,503,196.

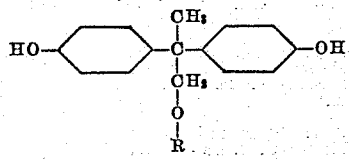

wherein R is a member of the group consisting of alkyl, and alkoxyalkyl radicals containing from 1 to 5 carbon atoms, inclusive, and aryl and chloraryl radicals of the benzene series. See U. S. Patent No. 2,526,545.

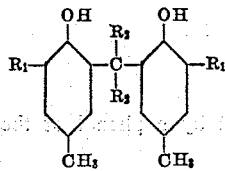

wherein R₁ is a substituent selected from the class consisting of secondary butyl and tertiary butyl groups and R₂ is a substituent selected from the class consisting of alkyl, cycloalkyl, aryl, aralkyl, and alkaryl groups. See U. S. Patent No. 2,515,960.

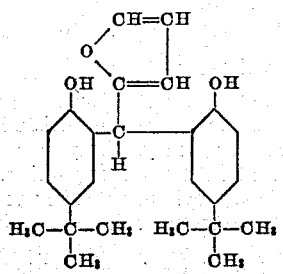

See U. S. Patent No. 2,515,908.

As to sulfides, the following compound is of interest:

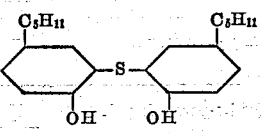

See U. S. Patent No. 2,331,448.

As to descriptions of various suitable phenol sulfides, reference is made to the following patents: U. S. Patents Nos. 2,246,321, 2,207,719, 2,174,248, 2,139,766, 2,244,021, and 2,195,539.

As to sulfones, see U. S. Patent No. 2,122,958.

As to suitable compounds obtained by the use of formaldehyde or some other aldehyde, particularly compounds such as

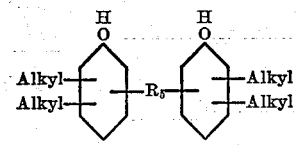

in which R₅ is a methylene radical, or a substituted methylene radical which represents the residue of an aldehyde and is preferably the unsubstituted methylene radical derived from formaldehyde. See U. S. Patent No. 2,430,002.

See also U. S. Patent No. 2,581,919 which describes di(dialkyl cresol) sulfides which include the monosulfides, the disulfides, and the polysulfides. The following formula represents the various dicresol sulfides of this invention:

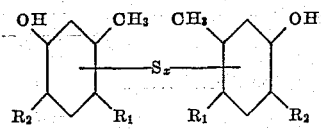

in which R₁ and R₂ are alkyl groups, the sum of whose carbon atoms equals 6 to about 20, and R₁ and R₂ each preferably contain 3 to about 10 carbon atoms, and $x$ is 1 to 4. The term "sulfides" as used in this text, therefore, includes monosulfide, disulfide, and polysulfides.

PART 4

It is well known that one can readily purchase on the open market, or prepare, fusible, organic solvent-soluble, water-insoluble resin polymers of a composition approximated in an idealized form by the formula

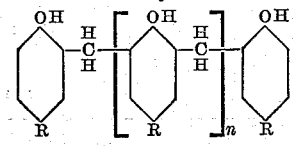

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 15 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance paraphenylphenol, one may obtain a resin which is not soluble in a nonoxygenated solvent, such as benzene, or xylene, but requires an oxygenated solvent such as a low molal alcohol, dioxane or diethyleneglycol diethylether.

Sometimes a mixture of the two solvents (oxygenated and nonoxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368, dated March 7, 1950, to De Groote and Keiser. In said patent there are described oxyalkylation-susceptible, fusible, nonoxygenated-organic solvent-soluble, water-insoluble, low-stage phenolaldehyde resins having an average molecular weight corresponding to at least 3 and not over 6 phenolic nuclei per resin molecule. These resins are difunctional only in regard to methylol-forming reactivity, are derived by reaction between a difunctional monohydric phenol and an aldehyde having not over 8 carbon atoms and reactive toward said phenol and are formed in the substantial absence of trifunctional phenols. The phenol is of the formula

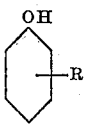

in which R is an aliphatic hydrocarbon radical having at least 4 carbon atoms and not more than 24 carbon atoms, and substituted in the 2,4,6 position.

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

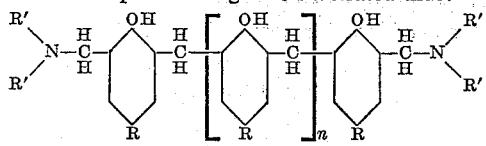

The basic nonhydroxylated amine may be designed thus:

In conducting reactions of this kind one does not necessarily obtain a hundred percent yield for obvious reasons. Certain side reactions may take place. For instance, 2 moles of amine may combine with one mole of the aldehyde or only one mole of the amine may combine with the resin molecule, or even to a very slight extent, if at all, 2 resin units may combine without any amine in the reaction product, as indicated in the following formulas:

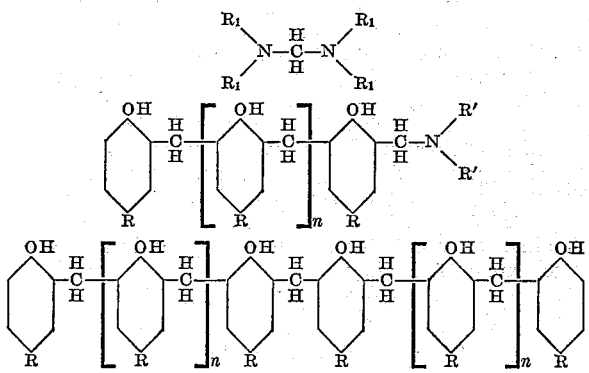

As has been pointed out previously, as far as the resin unit goes one can use a mole of aldehyde other than formaldehyde, such as acetaldehyde, propionaldehyde or butyraldehyde. The resin unit may be exemplified thus:

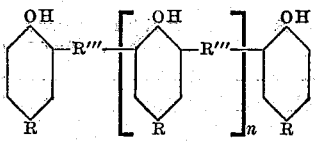

in which $R'''$ is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins we found no reason for using other than those which are lowest in price and most readily available commercially. For purposes of convenience suitable resins are characterized in the following table:

TABLE III

| Example number | R | Position of R | R''' derived from— | n | Mol. wt. of resin molecule (based on n+2) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclo-hexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |

TABLE III (continued)

| Example number | R | Position of R | R''' derived from— | n | Mol. wt. of resin molecule (based on n+2) |
|---|---|---|---|---|---|
| 31a | ...do... | ...do... | Acetaldehyde | 1.5 | 688.0 |
| 32a | Octyl | ...do... | ...do... | 1.5 | 786.0 |
| 33a | Nonyl | ...do... | ...do... | 1.5 | 835.0 |
| 34a | Octyl | ...do... | Butyraldehyde | 2.0 | 986.0 |
| 35a | Nonyl | ...do... | ...do... | 2.0 | 1,023.0 |
| 36a | Amyl | ...do... | ...do... | 2.0 | 860.0 |
| 37a | Butyl | ...do... | Formaldehyde | 2.0 | 636.0 |
| 38a | Amyl | ...do... | ...do... | 2.0 | 692.0 |
| 39a | Hexyl | ...do... | ...do... | 2.0 | 748.0 |
| 40a | Cyclo-hexyl | ...do... | ...do... | 2.0 | 740.0 |

PART 5

As has been pointed out previously the amine herein employed as a reactant is a basic hydroxylated secondary monoamine whose composition is indicated thus:

in which R' represents a monovalent alkyl, alicyclic, arylalkyl radical which may be heterocyclic in a few instances as in a secondary amine derived from furfurylamine by reaction of ethylene oxide or propylene oxide. Furthermore, at least one of the radicals designated by R' must have at least one hydroxyl radical. A large number of secondary amines are available and may be suitably employed as reactants for the present purpose. Among others, one may employ diethanolamine, methyl ethanolamine, dipropanolamine and ethylpropanolamine. Other suitable secondary amines are obtained, of course, by taking any suitable primary amine, such as an alkylamine, an arylalkylamine, or an alicyclic amine, and treating the amine with one mole of an oxyalkylating agent, such as ethylene oxide, propylene oxide, butylene oxide, glycide, or methylglycide. Suitable primary amines which can be so converted into secondary amines, include butylamine, amylamine, hexylamine, higher molecular weight amines derived from fatty acids, cyclohexylamine, benzylamine, furfurylamine, etc. In other instances secondary amines which have at least one hydroxyl radical can be treated similarly with an oxyalkylating agent, or, for that matter, with an alkylating agent such as benzylchloride, esters of chloracetic acid, alkyl bromides, dimethylsulfate, esters of sulfonic acid, etc., so as to convert the primary amine into a secondary amine. Among others, such amines include 2-amino-1-butanol, 2-amino-2-methyl-1-propanol, 2-amino-2-methyl-1,3-propanediol, 2-amino-2-ethyl-1,3-propanediol, and tri-(hydroxymethyl)-aminomethane. Another example of such amines is illustrated by 4-amino-4-methyl-2-pentanol.

Similarly, one can prepare suitable secondary amines which have not only a hydroxyl group but also one or more divalent oxygen linkages as part of an ether radical. The preparation of such amines or suitable reactants for preparing them has been described in the literature and particularly in two United States patents, to wit, U. S. Patents Nos. 2,325,514 dated July 27, 1943 to Hester, and 2,355,337 dated August 8, 1944 to Spence. The latter patent describes typical haloalkyl ethers such as $CH_3OC_2H_4Cl$

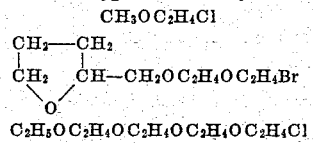

$C_2H_5OC_2H_4OC_2H_4OC_2H_4OC_2H_4Cl$

Such haloalkyl ethers can be reacted with ammonia or with a primary amine, such as ethanolamine, propanolamine, monoglycerylamine, etc., to produce a secondary amine in which there is not only present a hydroxyl radical but a repetitious ether linkage. Compounds can be readily obtained which are exemplified by the following formulas:

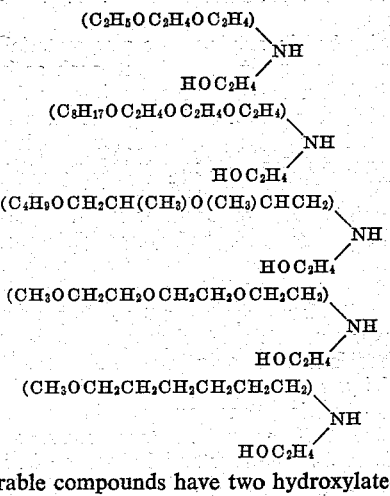

or comparable compounds have two hydroxylated groups of different lengths as in

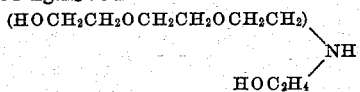

Other examples of suitable amines include alpha-methylbenzylamine and monoethanolamine; also amines obtained by treating cyclohexylmethylamine with one mole of an oxyalkylating agent as previously described; beta-ethylhexyl-butanolamine, diglycerylamine, etc. Another type of amine which is of particular interest because it includes a very definite hydrophile group includes sugar amines such as glucamine, galactamine and fructamine, such as N-hydroxyethylglucamine, N-hydroxyethylgalatamine, and N-hydroxyethylfructamine.

Other suitable amines may be illustrated by

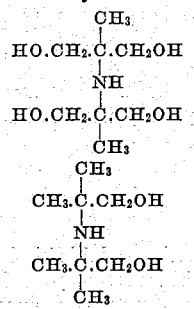

See, also, corresponding hydroxylated amines which can be obtained from rosin or similar raw materials and described in U. S. Patent No. 2,510,063, dated June 6, 1950, to Bried. Still other examples are illustrated by treatment of certain secondary amines, such as the following, with a mole of an oxyalkylating agent as described; phenoxyethylamine, phenoxypropylamine, phenoxyalphamethylethylamine, and phenoxypropylamine.

Other procedures for production of suitable compounds having a hydroxyl group and a single basic amino nitrogen atom can be obtained from any suitable alcohol or the like by reaction with a reagent which contains an epoxide group and a secondary amine group. Such reactants are described, for example, in U. S. Patents Nos. 1,977,251 and 1,977,253, both dated October 16, 1934, to Stallmann. Among the reactants described in said latter patent are the following:

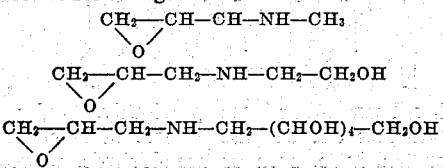

PART 6

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557 in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, we have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethyl-ether of ethyleneglycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, paraformaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable as in the case of ethyl or hexyl alcohol, and if there is to be subsequent oxyalkylation, then, obviously, the alcohol should not be used or else it should be removed. The fact that an oxygenated solvent need not be employed, of course, is an advantage for reasons stated.

Another factor, as far as the selection of solvent goes is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the products obtained are almost invariably a dark red in color or at least a red-amber, or some color which includes both an amber component and a reddish component. By and large, the melting point is apt to be lower and the products may be more sticky and more tacky than the original resin itself. Depending on the resin selected and on the amine selected the condensation product or reaction mass on a solvent-free basis may be hard, resinous and comparable to the resin itself.

The products obtained, depending on the reactants selected, may be water-insoluble, or water dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum, if required. This applies, of course, only to those circumstances where it is desirable or necessary to remove the solvent. Petroleum solvents, aromatic solvents, etc. can be used. The selection of solvent, such as benzene, xylene, or the like, depends primarily on cost, i. e., the use of the most economical solvent and also on three other factors, two of which have been previously mentioned; (a) is the solvent to remain in the reaction mass without removal? (b) is the reaction mass to be subjected to further reaction in which the solvent, for instance, an alcohol, either low boiling or high boiling, might interfere as in the case of oxyalkylation? and the third factor is this, (c) is an effort to be made to purify the reaction mass by the usual procedure as, for example, a water-wash to remove any unreacted low molal soluble amine, if employed and present after reaction? Such procedures are well known and, needless to say, certain solvents are more suitable than others. Everything else being equal, we have found xylene the most satisfactory solvent.

We have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. I have not found any case where it was necessary or even desirable to hold the low temperature stage for more than 24 hours. In fact, we are not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U. S. Patent 2,499,368. After the resin is in complete solution the amine is added and stirred. Depending on the amine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example 35° C. or slightly lower, provided this initial low temperature stage is employed. The formaldehyde is then added in a suitable form. For reasons pointed out we prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, foaming takes place, and other mechanical or chemical difficulties are involved. We have found no advantage in using solid formaldehyde because even here water of reaction is formed.

Returning again to the preferred method of reaction and particularly from the standpoint of laboratory procedure employing a glass resin pot, when the reaction has proceeded as one can reasonably expect at a low temperature, for instance, after holding the reaction mass with or without stirring, depending on whether or not it is homogeneous, at 30° or 40° C., for 4 or 5 hours, or at the most, up to 10–24 hours, we then complete the reaction by raising the temperature up to 150° C., or thereabouts as required. The initial low temperature procedure can be eliminated or reduced to merely the shortest period of time which avoids loss of amine or formaldehyde. At a higher temperature we use a phase-separating trap and subject the mixture to reflux condensation until the water of reaction and the water of solution of the formaldehyde is eliminated. We then permit the temperature to rise to somewhere about 100° C., and generally slightly above 100° C., and below 150° C., by eliminating the solvent or part of the solvent so the reaction mass stays within this predetermined range. This period of heating and refluxing, after the water is eliminated, is continued until the reaction mass is homogeneous and then for one to three hours longer. The removal of the solvents is conducted in a conventional manner in the same way as the removal of solvents in resin manufacture as described in aforementioned U. S. Patent No. 2,499,368.

Needless to say, as far as the ratio of reactants goes we have invariably employed approximately one mole of the resin based on the molecular weight of the resin molecule, 2 moles of the secondary amine and 2 moles of formaldehyde. In some instances we have added a trace of caustic as an added catalyst but have found no particular advantage in this. In other cases we have used a slight excess of formaldehyde and, again, have not found any particular advantage in this. In other cases we have used a slight excess of amine and, again, have not found any particular advantage in so doing. Whenever feasible we have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted amine, if any is present, is another index.

In light of what has been said previously, little more need be said as to the actual procedure employed for the preparation of the herein described condensation products. The following example will serve by way of illustration.

*Example 1b*

The phenol-aldehyde resin is the one that has been identified previously as Example 2a. It was obtained from a para-tertiary butylphenol and formaldehyde. The resin was prepared using an acid catalyst which was completely neutralized at the end of the reaction. The molecular weight of the resin was 882.5. This corresponded to an average of about 3½ phenolic nuclei, as the value for $n$ which excludes the 2 external nuclei, i. e., the resin was largely a mixture having 3 nuclei and 4 nuclei, excluding the 2 external nuclei, or 5 and 6 overall nuclei. The resin so obtained in a neutral state had a light amber color.

882 grams of the resin identified as 2a preceding were powdered and mixed with 700 grams of xylene. The mixture was refluxed until solution was complete. It was then adjusted to approximately 30° to 35° C. and 210 grams of diethanolamine added. The mixture was stirred vigorously and formaldehyde added slowly. The formaldehyde used was a 37% solution and 160 grams were employed which were added in about 3 hours. The mixture was stirred vigorously and kept within a temperature range of 30° to 45° C. for about 21 hours. At the end of this period of time it was refluxed, using a phase-separating trap and a small amount of aqueous distillate withdrawn from time to time and the presence of unreacted formaldehyde noted. Any unreacted formaldehyde seemed to disappear within approximately 3 hours after the refluxing was started. As soon as the odor of formaldehyde was no longer detectable the phase-separating trap was set so as to eliminate all water of solution and reaction. After the water was eliminated part of the xylene was removed until the temperature reached about 150° C. The mass was kept at this higher temperature for about 3¾ hours and reaction stopped. During this time any additional water, which was probably water of reaction which had formed, was eliminated by means of the trap. The residual xylene was permitted to stay in the cogeneric mixture. A small amount of the sample was heated on a water bath to remove the excess xylene and the residual material was dark red in color and had the consistency of a sticky fluid or a tacky resin. The overall reaction time was a little over 30 hours. In other instances it has varied from approximately 24 to 36 hours. The time can be reduced by cutting the low temperature period to about 3 to 6 hours.

Note that in Table IV following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table IV.

pointed out in detail elsewhere. However, in many instances the derivatives obtained by oxyalkylation are even more valuable and from such standpoint the herein described products may be considered as valuable intermediates. Subsequent oxyalkylation involves the use of ethylene oxide, propylene oxide, butylene oxide, glycide, etc. Such oxyalkylating agents are monoepoxides as differentiated from polyepoxides.

It becomes apparent that if the product obtained is to be treated subsequently with a monoepoxide which may require a pressure vessel as in the case of ethylene oxide, it is convenient to use the same reaction vessel in both instances. In other words, the 2 moles of the

TABLE IV

| Ex. No. | Resin used | Amt., grs. | Amine used and amount | Strength of formaldehyde soln. and amt. | Solvent used and amt. | Reaction temp., °C. | Reaction time, (hrs.) | Max. distill. temp., °C. |
|---|---|---|---|---|---|---|---|---|
| 1b | 2a | 882 | Diethanolamine, 210 g | 37%, 162 g | Xylene, 700 g | 22-26 | 32 | 137 |
| 2b | 5a | 480 | Diethanolamine, 105 g | 37%, 81 g | Xylene, 450 g | 21-23 | 28 | 150 |
| 3b | 10a | 633 | ----do---- | ----do---- | Xylene, 600 g | 20-22 | 36 | 145 |
| 4b | 2a | 441 | Dipropanolamine, 133 g | 30%, 100 g | Xylene, 400 g | 20-23 | 34 | 146 |
| 5b | 5a | 480 | ----do---- | ----do---- | Xylene, 450 g | 21-23 | 24 | 141 |
| 6b | 10a | 633 | ----do---- | ----do---- | Xylene, 600 g | 21-28 | 24 | 145 |
| 7b | 2a | 882 | Ethylethanolamine, 178 g | 37%, 162 g | Xylene, 700 g | 20-26 | 24 | 152 |
| 8b | 5a | 480 | Ethylethanolamine, 89 g | 37%, 81 g | Xylene, 450 g | 24-30 | 28 | 151 |
| 9b | 10a | 633 | ----do---- | ----do---- | Xylene, 600 g | 22-25 | 27 | 147 |
| 10b | 13a | 473 | Cyclohexylethanolamine, 143 g | 30%, 100 g | Xylene, 450 g | 21-31 | 31 | 146 |
| 11b | 14a | 511 | ----do---- | 37%, 81 g | ----do---- | 22-23 | 36 | 148 |
| 12b | 15a | 665 | ----do---- | ----do---- | Xylene, 550 g | 20-24 | 27 | 152 |
| 13b | 2a | 441 | $C_2H_5OC_2H_4OC_2H_4$\NH, 176 g /HOC$_2$H$_4$ | ----do---- | Xylene, 400 g | 21-25 | 24 | 150 |
| 14b | 5a | 480 | $C_2H_5OC_2H_4OC_2H_4$\NH, 176 g /HOC$_2$H$_4$ | ----do---- | Xylene, 450 g | 20-26 | 26 | 146 |
| 15b | 9a | 595 | $C_2H_5OC_2H_4OC_2H_4$\NH, 176 g /HOC$_2$H$_4$ | ----do---- | Xylene, 550 g | 21-27 | 30 | 147 |
| 16b | 2a | 441 | $HOC_2H_4OC_2H_4OC_2H_4$\NH, 192 g /HOC$_2$H$_4$ | ----do---- | Xylene, 400 g | 20-22 | 30 | 148 |
| 17b | 5a | 480 | $HOC_2H_4OC_2H_4OC_2H_4$\NH, 192 g /HOC$_2$H$_4$ | ----do---- | ----do---- | 20-25 | 28 | 150 |
| 18b | 14a | 511 | $HOC_2H_4OC_2H_4OC_2H_4$\NH, 192 g /HOC$_2$H$_4$ | ----do---- | Xylene, 500 g | 21-24 | 32 | 149 |
| 19b | 22a | 498 | $HOC_2H_4OC_2H_4OC_2H_4$\NH, 192 g /HOC$_2$H$_4$ | ----do---- | Xylene, 450 g | 22-25 | 32 | 153 |
| 20b | 23a | 542 | $CH_3(OC_2H_4)_3$\NH, 206 g /HOC$_2$H$_4$ | 30%, 100 g | Xylene, 500 g | 21-23 | 36 | 151 |
| 21b | 25a | 547 | $CH_3(OC_2H_4)_3$\NH, 206 g /HOC$_2$H$_4$ | ----do---- | ----do---- | 25-30 | 34 | 148 |
| 22b | 2a | 441 | $CH_3(OC_2H_4)_3$\NH, 206 g /HOC$_2$H$_4$ | ----do---- | Xylene, 400 g | 22-23 | 31 | 146 |
| 23b | 26a | 595 | Decylethanolamine, 201 g | 37%, 81 g | Xylene, 500 g | 22-27 | 24 | 145 |
| 24b | 27a | 391 | Decylethanolamine, 100 g | 30%, 50 g | Xylene, 300 g | 21-25 | 26 | 147 |

PART 7

The products obtained as herein described by reactions involving amine condensates and diglycidyl ethers or the equivalent are valuable for use as such. This is amine-modified phenol-aldehyde resin condensate would be reacted with a polyepoxide and then subsequently with a monoepoxide. In any event, if desired the polyepoxide reaction can be conducted in an ordinary reaction vessel, such as the usual glass laboratory equipment. This is particularly true of the kind used for resin manufacture as described in a number of patents, as for example, U. S. Patent No. 2,499,365.

Cognizance should be taken of one particular feature in connection with the reaction involving the polyepoxide and that is this; the amine-modified phenol-aldehyde resin condensate is invariably basic and thus one need not add the usual catalysts which are used to promote such reactions. Generally speaking, the reaction will proceed at a satisfactory rate under suitable conditions without any catalyst at all.

Employing polyepoxides in combination with a nonbasic reactant the usual catalysts include alkaline materials such as caustic soda, caustic potash, sodium methylate, etc. Other catalysts may be acidic in nature and are of the kind characterized by iron and tin chloride. Furthermore, insoluble catalysts such as clays or specially prepared mineral catalysts have been used. If for any reason the reaction did not proceed rapidly enough with the diglycidyl ether or other analogous reactant, then a small amount of finely divided caustic soda or sodium methylate could be employed as a catalyst. The amount generally employed would be 1% or 2%.

It goes without saying that the reaction can take place in an inert solvent, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The selection of the solvent depends in part on the subsequent use of the derivatives or reaction products. If the reaction products are to be rendered solvent-free and it is necessary that the solvent be readily removed as, for example, by the use of vacuum distillation, thus xylene or an aromatic petroleum will serve. If the product is going to be subjected to oxyalkylation subsequently, then the solvent should be one which is not oxyalkylation-susceptible. It is easy enough to select a suitable solvent if required in any instance but, everything else being equal, the solvent chosen should be the most economical one.

*Example 1C*

The product was obtained by reaction between the diepoxide previously designated as diepoxide 3A, and condensate 2b. Condensate 2b was obtained from resin 5a. Resin 5a in turn was obtained from tertiary amylphenol and formaldehyde. Condensate 2b employed as reactants resin 5a and diethanolamine. The amount of resin employed was 480 grams; the amount of diethanolamine employed was 105 grams, and the amount of 37% formaldehyde employed was 81 grams, and the amount of solvent (xylene) employed was 450 grams. All this has been described previously.

The solution of the condensate in xylene was adjusted to a 50% solution. In this particular instance, and in practically all the others which appear in the subsequent table, the examples are characterized by the fact that no alkaline catalyst was added. The reason is, of course, that the condensate as such is strongly basic. If desired, a small amount of an alkaline catalyst could be added, such as finely powdered caustic soda, sodium methylate, etc. If such alkaline catalyst is added it may speed up the reaction but it also may cause an undesirable reaction, such as the polymerization of a diepoxide.

In any event, 119 grams of the condensate dissolved in approximately an equal amount of xylene were stirred and heated to 100° C., and 17 grams of diepoxide previously identified as 3A and dissolved in an equal weight of xylene were added dropwise. An initial addition of the xylene solution carried the temperature to about 108° C. The remainder of the diepoxide was added in approximately an hour's time. During this period of time the reaction rose to about 126° C. The product was allowed to reflux at approximately 125° C. to 130° C. using a phase-separating trap. A small amount of xylene was removed by means of this phase-separating trap so the reflux temperature rose gradually to about 180° C. The mixture was then refluxed at 180° C. for approximately 5 hours until the reaction stopped and the xylene which had been removed during the reflux period was returned to the mixture. A small amount of material was withdrawn and the xylene evaporated on a hot plate in order to examine the physical properties. The material was a dark red viscous semi-solid. It was insoluble in water, it was insoluble in a 5% gluconic acid solution but was soluble in xylene and particularly in a mixture of 80% xylene and 20% methanol.

However, if the material was dissolved in an oxygenated solvent and then shaken with 5% gluconic acid it showed a definite tendency to disperse, suspend, or form a sol, and particularly in a xylene-methanol mixed solvent as previously described, with or without the further addition of a little acetone.

The procedure employed of course is simple in light of what has been said previously and in effect is a procedure similar to that employed in the use of glycide or methylglycide as oxyalkylating agents. See, for example, Part 1 of U. S. Patent No. 2,602,062 dated July 1, 1952, to De Groote.

Various examples obtained in substantially the same manner are enumerated in the following tables:

TABLE V

| Ex. No. | Condensate used | Amt., grs. | Diepoxide used | Amt., grs. | Xylene, grs. | Molar ratio | Time of reaction, hrs. | Max. temp., °C. | Color and physical state |
|---|---|---|---|---|---|---|---|---|---|
| 1C | 2b | 119 | 3A | 17 | 136 | 2:1 | 5 | 180 | Dark viscous semi-solid. |
| 2C | 5b | 125 | 3A | 17 | 142 | 2:1 | 5 | 180 | Do. |
| 3C | 7b | 108 | 3A | 17 | 125 | 2:1 | 5 | 185 | Do. |
| 4C | 8b | 116 | 3A | 17 | 133 | 2:1 | 5 | 180 | Do. |
| 5C | 10b | 126 | 3A | 17 | 143 | 2:1 | 5 | 190 | Do. |
| 6C | 12b | 164 | 3A | 17 | 181 | 2:1 | 6 | 180 | Dark solid mass. |
| 7C | 13b | 126 | 3A | 17 | 143 | 2:1 | 6 | 190 | Do. |
| 8C | 18b | 143 | 3A | 17 | 160 | 2:1 | 6 | 190 | Do. |
| 9C | 19b | 140 | 3A | 17 | 157 | 2:1 | 6 | 195 | Do. |
| 10C | 20b | 152 | 3A | 17 | 169 | 2:1 | 6 | 190 | Do. |

TABLE VI

| Ex. No. | Condensate used | Amt., grs. | Diepoxide used | Amt., grs. | Xylene, grs. | Molar ratio | Time of reaction, hrs. | Max. temp., °C. | Color and physical state |
|---|---|---|---|---|---|---|---|---|---|
| 1D | 2b | 119 | B1 | 27.5 | 146.5 | 2:1 | 6 | 185 | Dark viscous semi-solid. |
| 2D | 5b | 125 | B1 | 27.5 | 152.5 | 2:1 | 7 | 188 | Do. |
| 3D | 7b | 108 | B1 | 27.5 | 135.5 | 2:1 | 6 | 180 | Do. |
| 4D | 8b | 116 | B1 | 27.5 | 143.5 | 2:1 | 6 | 182 | Do. |
| 5D | 10b | 126 | B1 | 27.5 | 153.5 | 2:1 | 8 | 185 | Do. |
| 6D | 12b | 164 | B1 | 27.5 | 191.5 | 2:1 | 8 | 190 | Dark solid mass. |
| 7D | 13b | 126 | B1 | 27.5 | 153.5 | 2:1 | 7 | 180 | Do. |
| 8D | 18b | 143 | B1 | 27.5 | 170.5 | 2:1 | 8 | 184 | Do. |
| 9D | 19b | 140 | B1 | 27.5 | 167.5 | 2:1 | 8 | 185 | Do. |
| 10D | 20b | 152 | B1 | 27.5 | 179.5 | 2:1 | 8 | 190 | Do. |

Solubility in regard to all these compounds was substantially similar to that which was described in Example 1C.

TABLE VII

| Ex. No. | Resin condensate used | Probable molec. wt. reaction product | Amt. of product, grs. | Amt. of solvent, grs. | Probable number of hydroxyls per molecule |
|---|---|---|---|---|---|
| 1C | 2b | 2,720 | 2,730 | 1,370 | 19 |
| 2C | 5b | 2,840 | 2,835 | 1,415 | 19 |
| 3C | 7b | 2,500 | 2,513 | 1,263 | 15 |
| 4C | 8b | 2,660 | 2,672 | 1,342 | 15 |
| 5C | 10b | 2,860 | 2,864 | 1,434 | 15 |
| 6C | 12b | 3,620 | 3,635 | 1,825 | 15 |
| 7C | 13b | 2,860 | 2,875 | 1,445 | 15 |
| 8C | 18b | 3,200 | 3,210 | 1,610 | 19 |
| 9C | 19b | 3,140 | 3,155 | 1,585 | 22 |
| 10C | 20b | 3,380 | 3,390 | 1,700 | 20 |

TABLE VIII

| Ex. No. | Resin condensate used | Probable molec. wt. reaction product | Amt. of product, grs. | Amt. of solvent, grs. | Probable number of hydroxyls per molecule |
|---|---|---|---|---|---|
| 1D | 2b | 2,930 | 2,935 | 1,470 | 19 |
| 2D | 5b | 3,050 | 3,058 | 1,533 | 19 |
| 3D | 7b | 2,710 | 2,724 | 1,369 | 15 |
| 4D | 8b | 2,870 | 2,888 | 1,453 | 15 |
| 5D | 10b | 3,070 | 3,074 | 1,539 | 15 |
| 6D | 12b | 3,830 | 3,830 | 1,815 | 15 |
| 7D | 13b | 3,070 | 3,085 | 1,550 | 15 |
| 8D | 18b | 3,410 | 3,420 | 1,715 | 19 |
| 9D | 19b | 3,350 | 3,360 | 1,685 | 22 |
| 10D | 20b | 3,590 | 3,600 | 1,805 | 20 |

At this point it may be desirable to direct attention to two facts, the first being that we are aware that other diepoxides free from an aromatic radical as, for example, epoxides derived from ethylene glycol, glycerine, or the like, such as the following:

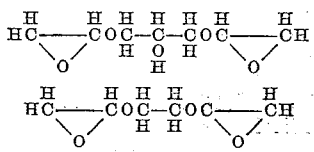

may be employed to replace the diepoxides herein described. However, such derivatives are not included as part of the instant invention.

At times we have found a tendency for an insoluble mass to form or at least to obtain incipient cross-linking or gelling even when the molal ratio is in order of 2 moles of resin to one of diepoxide. We have found this can be avoided by any one of the following procedures or their equivalent. Dilute the resin or the diepoxide, or both, with an inert solvent, such as xylene or the like. In some instances an oxygenated solvent, such as the diethyl ether of ethyleneglycol may be employed. Another procedure which is helpful is to reduce the amount of catalyst used, or reduce the temperature of reaction by adding a small amount of initially lower boiling solvent such as benzene, or use benzene entirely. Also, we have found it desirable at times to use slightly less than apparently the theoretical amount of diepoxide, for instance 90% to 95% instead of 100%.

PART 8

Conventional demulsifying agents employed in the treatment of oil field emulsions are used as such, or after dilution with any suitable solvent, such as water, petroleum hydrocarbons, such as benzene, toluene, xylene, tar acid oil, resol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of our process.

In practicing the present process, the treating or demulsifying agent is used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

As noted above, the products herein described may be used not only in diluted form, but also may be used admixed with some other chemical demulsifier. A mixture which illustrates such combination is the following:

The demulsifier of the present invention, for example, the product of Example 2C, 20%;

A cyclohexylamine salt of a polypropylated naphthalene monosulfonic acid, 24%;

An ammonium salt of a polypropylated naphthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described our invention, what we claim as new and desire to secure by Letters Patent is:

1. A process for breaking petroleum emulsions of the water-in-oil type characterized by subjecting the emulsion to the action of a demulsifier, said demulsifier being obtained by first (A) condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

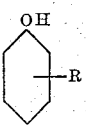

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by (B) reacting said resin condensate with a phenolic polyepoxide free from reactive functional groups other than epoxy and hydroxyl groups and cogenerically associated compounds formed in the preparation of said polyepoxides; said epoxides being monomers and low molal polymers not exceeding the tetramers; said polyepoxides being selected from the class consisting of (aa) compounds where the phenolic nuclei are directly joined without an intervening bridge radical, and (bb) compounds containing a radical in which 2 phenolic nuclei are joined by a divalent radical selected from the class consisting of ketone residues formed by the elimination of the ketonic oxygen atom, and aldehyde residues obtained by the elimination of the ketonic oxygen atom, and aldehyde residues obtained by the elimination of the aldehyde oxygen atom, the divalent radical

the divalent

radical, the divalent sulfone radical, and the divalent monosulfide radical —S—, the divalent radical

—CH₂SCH₂— and the divalent disulfide radical —S—S—; said phenolic portion of the diepoxides being obtained from a phenol of the structure.

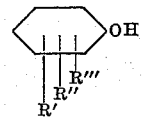

in which R′, R″, and R‴ represent a member of the class consisting of hydrogen and hydrocarbon substituents of the aromatic nucleus, said substituent member having not over 18 carbon atoms; with the further proviso that said reactive compounds (A) and (B) be members of the class consisting of non-thermosetting organic solvent-soluble liquids and low-melting solids; with the added proviso that the reaction product be a member of the class of solvent-soluble liquids and low-melting solids; said reaction between (A) and (B) be conducted below the pyrolytic point of the reactants and the resultants of reaction; and with the final proviso that the ratio of reactants be 2 moles of the resin condensate to 1 mole of the phenolic polyepoxide.

2. A process for breaking petroleum emulsions of the water-in-oil type characterized by subjecting the emulsion to the action of a demulsifier, said demulsifier being obtained by first (A) condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

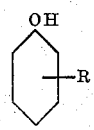

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by (B) reacting phenolic epoxides being principally polyepoxides, including phenolic diepoxides; said epoxides being free from reactive functional groups other than epoxy and hydroxyl groups, and including additionally cogenerically associated compounds formed in the preparation of said polyepoxides and diepoxides; said epoxides being monomers and low molar polymers not exceeding the tetramer; said epoxides being selected from the class consisting of (aa) compounds where the phenolic nuclei are directly joined without an intervening radical, and (bb) compounds containing a radical in which 2 phenolic nuclei are joined by a divalent radical selected from the class consisting of ketone residues formed by the elimination of the ketonic oxygen atom, and aldehyde residues obtained by the elimination of the aldehydic oxygen atom, the divalent radical

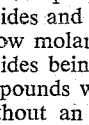

the divalent

radical, the divalent sulfonic radical, and the divalent radical —CH₂SCH₂—, and the divalent disulfide radical —S—S—; said phenolic portion of the diepoxide being obtained from a phenol of the structure

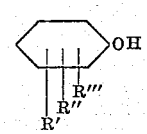

in which R′, R″, and R‴ represent a member of the class consisting of hydrogen and hydrocarbon substituents of the aromatic nucleus, said substituent member having not over 18 carbon atoms; with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) be conducted below the pyroltic point of the reactants and resultants of reaction.

3. A process for breaking petroleum emulsions of the water-in-oil type characterized by subjecting the emulsion to the action of a demulsifier, said demulsifier being obtained by first (A) condensing (a) an oxyalkylation-susceptible, fusible, non-oxygenated organic solvent-soluble water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difuctional monohydric phenol and an aldehyde having not over 8 carbon atoms and reactive toward said phenol; said resin being formed in the substantial absence of trifunctional phenols; said phenol being of the formula

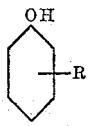

in which R is an aliphatic hydrocarbon radical having at least 4 and not more than 24 carbon atoms and substituted in the 2, 4, 6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by (B) reacting a phenolic diepoxide free from reactive functional groups other than epoxy and hydroxyl groups, and cogenerically associated compounds formed in the preparation of said diepoxides; said epoxides being monomers and low molal polymers not exceeding the tetramers; said epoxides being selected from the class consisting of (aa) compounds where the phenolic nuclei are directly joined without an intervening bridge radical, and (bb) compounds containing a radical in which 2 phenolic nuclei are joined by a divalent radical selected from the class consisting of ketone residues formed by the elimination of the ketonic oxygen atom, and aldehyde residues obtained by the elimination of the aldehydic oxygen atom, the divalent radical

the divalent

radical, the divalent sulfone radical, and the divalent monosulfide radical —S—, the divalent radical

—CH₂SCH₂— and the divalent disulfide radical —S—S—; said phenolic portion of the diepoxide being obtained from a phenol of the structure

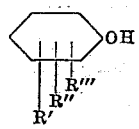

in which R', R", and R''' represent a member of the class consisting of hydrogen and hydrocarbon substituents of the aromatic nucleus, said substituent member having not over 18 carbon atoms; with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) be conducted below the pyrolytic point of the reactants and the resultants of reaction.

4. A process for breaking petroleum emulsions of the water-in-oil type characterized by subjecting the emulsion to the action of a demulsifier, said demulsifier being obtained by first (A) condensing (a) an oxyalkylation-susceptible, fusible, nonoxygenated organic solvent-soluble water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

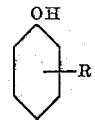

in which R is an aliphatic hydrocarbon radical having at least 4 and not more than 24 carbon atoms and substituted in the 2, 4, 6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resulants of reaction; and with the proviso that the resinous condensation product resulting from the process be heat-stable and oxyalkylation-susceptible; followed by (B) reacting a phenolic diepoxide free from reactive functional groups other than epoxy and hydroxyl groups, and cogenerically associated compounds formed in the preparation of said diepoxides; said epoxides being selected from the class consisting of (aa) compounds where the phenolic nuclei are directly joined without an intervening bridge radical, and (bb) compounds containing a radical in which 2 phenolic nuclei are joined by a divalent radical selected from the class consisting of ketone residues formed by the elimination of the ketone residues formed by the elimination of the ketonic oxygen atom, and aldehyde residues obtained by the elimination of the ketonic oxygen atom, and aldehyde residues obtained by the elimination of the aldehydic oxygen atoms, the divalent radical

the divalent

radical, the divalent sulfone radical, and the divalent monosulfide radical —S—, the divalent radical

—CH₂SCH₂— and the divalent disulfide radical —S—S—; said phenolic portion of the diepoxide being obtained from a phenol of the structure

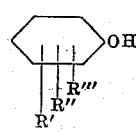

in which R', R'', and R''' represent a member of the class consisting of hydrogen and hydrocarbon substituents of the aromatic nucleus, said substituent member having not over 18 carbon atoms; the ratio of reactant (A) to reactant (B) being at least sufficient so there is available at least one active hydrogen in (A) for each oxirane ring in the diepoxide reactant (B); with the further proviso that said reactive compounds (A) and (B) the members of the class consisting of non-thermosetting organic solvent-soluble liquids and low-melting solids; with the final proviso that the reaction product be a member of the class of solvent-soluble liquids and low-melting solids; and said reaction between (A) and (B) be conducted below the pyrolytic point of the reactants and the resultants of reaction.

5. A process for breaking petroleum emulsions of the water-in-oil type characterized by subjecting the emulsion to the action of a demulsifier, said demulsifier being obtained by first (A) condensing (a) an oxyalkylation-susceptible, fusible, nonoxygenated organic solvent-soluble water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

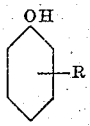

in which R is an aliphatic hydrocarbon radical having at least 4 and not more than 24 carbon atoms and substituted in the 2, 4, 6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by (B) reacting a phenolic diepoxide free from reactive functional groups other than epoxy and hydroxyl groups, and cogenerically associated compounds formed in the preparation of said diepoxides, including monoepoxides; said cogenerically associated compounds containing an average of more than one epoxide group per molecule; said epoxides being monomers and low molal polymers not exceeding the tetramers; said epoxides being selected from the class consisting of (aa) compounds where the phenolic nuclei are directly joined without an intervening bridge radical, and (bb) compounds containing a radical in which 2 phenolic nuclei are joined by a divalent radical selected from the class consisting of ketone residues formed by the elimination of the ketonic oxygen atom, and aldehyde residues obtained by the elimination of the aldehydic oxygen atom, the divalent radical

the divalent

radical, the divalent sulfone radical, and the divalent monosulfide radical —S—, the divalent radical

—CH₂SCH₂— and the divalent disulfide radical —S—S—; said phenolic portion of the diepoxide being obtained from a phenol of the structure

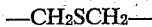
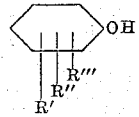

in which R', R'', and R''' represent a member of the class consisting of hydrogen and hydro-substituents of the aromatic nucleus, said substituent member having not over 18 carbon atoms, the ratio of reactant (A) to reactant (B) being at least sufficient so there is available at least one active hydrogen in (A) for each oxirane ring in the diepoxide reactant (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

6. A process for breaking petroleum emulsions of the water-in-oil type characterized by subjecting the emulsion to the action of a demulsifier, said demulsifier being obtained by first (A) condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

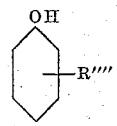

in which R'''' is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by (B) reacting a member of the class consisting of (aa) compounds of the following formula

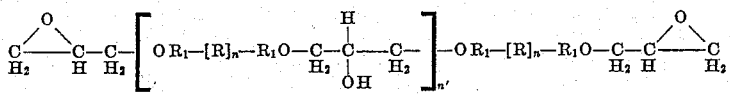

in which R represents a divalent radical selected from the class consisting of ketone residues formed by the elimination of the ketonic oxygen atom and aldehyde residues obtained by the elimination of the aldehydic oxygen atom, the divalent radical

the divalent

radical, the divalent sulfone radical, and the divalent monosulfide radical —S—; the divalent radical

and the divalent disulfide radical —S—S—; and R₁O is the divalent radical obtained by the elimination of a hydroxyl hydrogen atom and a nuclear hydrogen atom from the phenol

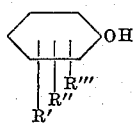

in which R', R'', and R''' represents a member of the class consisting of hydrogen and hydrocarbon substituents of the aromatic nucleus, said substituent member having not over 18 carbon atoms; the ratio of reactant (A) to reactant (B) being at least sufficient so there is available at least one active hydrogen in (A) for each oxirane ring in the diepoxide reactant (B); $n$ represents an integer selected from the class of zero and 1, and $n'$ represents a whole number not greater than 3; and $(bb)$ cogenerically associated compounds formed in the preparation of $(aa)$ preceding, including monoepoxides; with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

7. A process for breaking petroleum emulsions of the water-in-oil type characterized by subjecting the emulsion to the action of a demulsifier, said demulsifier being obtained by first (A) condensing $(a)$ an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

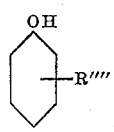

in which R'''' is an aliphatic hydrocarbon radical having at least 4 and not more than 24 carbon atoms and substituted in the 2,4,6 position; $(b)$ a basic hydroxylated secondary monoamine having not more than 32 carbon atoms in any group attached to the amino nitrogen atom, and $(c)$ formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by (B) reacting a member of the class consisting of $(aa)$ compounds of the following formula

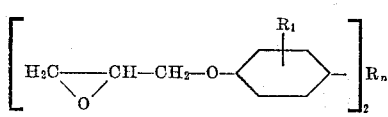

wherein R is an aliphatic hydrocarbon bridge, each $n$ independently has one of the values 0 to 1, and R₁ is an alkyl radical containing from 1 to 12 carbon atoms, and $(bb)$ cogenerically associated compounds formed in the preparation of $(aa)$ preceding, including monoepoxides; with the proviso that (B) consist principally of the monomer as distinguished from other cogeners; the ratio of reactant (A) to reactant (B) being at least sufficient so there is available at least one active hydrogen in (A) for each oxirane ring in the diepoxide reactant (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

8. A process for breaking petroleum emulsions of the water-in-oil type characterized by subjecting the emulsion to the action of a demulsifier, said demulsifier being obtained by first (A) condensing $(a)$ an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

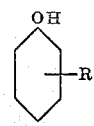

in which R is an aliphatic hydrocarbon radical having at least 4 and not more than 24 carbon atoms and substituted in the 2,4,6 position; $(b)$ a basic hydroxylated secondary monoamine having not more than 32 carbon atoms in any group attached to the amino nitrogen atom, and $(c)$ formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by (B) reacting a member of the class consisting of $(aa)$ compounds of the following formula

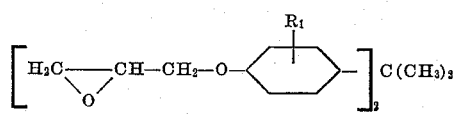

and $(bb)$ cogenerically associated compounds formed in the preparation of $(aa)$ preceding, including monoepoxides; with the proviso that (B) consist principally of the monomer as distinguished from other cogeners; the ratio of reactant $(a)$ to reactant (B) being at least sufficient so there is available at least one active hydrogen in (A) for each oxirane ring in the diepoxide reactant (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

9. The process of claim 8 wherein the precursory phenol contains at least 4 and not over 14 carbon atoms in the substituent radical.

10. The process of claim 8 wherein the precursory phenol contains at least 4 and not over 14 carbon atoms in the substituent radical and the precursory aldehyde is formaldehyde.

11. The process of claim 1, with the proviso that the hydrophile properties of the product of the condensation reaction employed in the form of a member of the class consisting of (a) the anhydro base as is, (b) the free base, and (c) the salt of gluconic acid, in an equal weight of xylene are sufficient to produce an emulsion when said xylene solution is shaken vigorously with 1 to 3 volumes of water.

12. The process of claim 2, with the proviso that the hydrophile properties of the product of the condensation reaction employed in the form of a member of the class consisting of (a) the anhydro base as is, (b) the free base, and (c) the salt of gluconic acid, in an equal weight of xylene are sufficient to produce an emulsion when said xylene solution is shaken vigorously with 1 to 3 volumes of water.

13. The process of claim 3, with the proviso that the hydrophile properties of the product of the condensation reaction employed in the form of a member of the class consisting of (a) the anhydro base as is, (b) the free base, and (c) the salt of gluconic acid, in an equal weight of xylene are sufficient to produce an emulsion when said xylene solution is shaken vigorously with 1 to 3 volumes of water.

14. The process of claim 4, with the proviso that the hydrophile properties of the product of the condensation reaction employed in the form of a member of the class consisting of (a) the anhydro base as is, (b) the free base, and (c) the salt of gluconic acid, in an equal weight of xylene are sufficient to produce an emulsion when said xylene solution is shaken vigorously with 1 to 3 volumes of water.

15. The process of claim 5, with the proviso that the hydrophile properties of the product of the condensation reaction employed in the form of a member of the class consisting of (a) the anhydro base as is, (b) the free base, and (c) the salt of gluconic acid, in an equal weight of xylene are sufficient to produce an emulsion when said xylene solution is shaken vigorously with 1 to 3 volumes of water.

16. The process of claim 6, with the proviso that the hydrophile properties of the product of the condensation reaction employed in the form of a member of the class consisting of (a) the anhydro base as is, (b) the free base, and (c) the salt of gluconic acid, in an equal weight of xylene are sufficient to produce an emulsion when said xylene solution is shaken vigorously with 1 to 3 volumes of water.

17. The process of claim 7, with the proviso that the hydrophile properties of the product of the condensation reaction employed in the form of a member of the class consisting of (a) the anhydro base as is, (b) the free base, and (c) the salt of gluconic acid, in an equal weight of xylene are sufficient to produce an emulsion when said xylene solution is shaken vigorously with 1 to 3 volumes of water.

18. The process of claim 8, with the proviso that the hydrophile properties of the product of the condensation reaction employed in the form of a member of the class consisting of (a) the anhydro base as is, (b) the free base, and (c) the salt of gluconic acid, in an equal weight of xylene are sufficient to produce an emulsion when said xylene solution is shaken vigorously with 1 to 3 volumes of water.

19. The process of claim 9, with the proviso that the hydrophile properties of the product of the condensation reaction employed in the form of a member of the class consisting of (a) the anhydro base as is, (b) the free base, and (c) the salt of gluconic acid, in an equal weight of xylene are sufficient to produce an emulsion when said xylene solution is shaken vigorously with 1 to 3 volumes of water.

20. The process of claim 10, with the proviso that the hydrophile properties of the product of the condensation reaction employed in the form of a member of the class consisting of (a) the anhydro base as is, (b) the free base, and (c) the salt of gluconic acid, in an equal weight of xylene are sufficient to produce an emulsion when said xylene solution is shaken vigorously with 1 to 3 volumes of water.

References Cited in the file of this patent

UNITED STATES PATENTS

| | | |
|---|---|---|
| 2,098,869 | Harmon et al. | Nov. 9, 1937 |
| 2,191,943 | Russell et al. | Feb. 27, 1940 |
| 2,457,634 | Bond et al. | Dec. 28, 1948 |
| 2,494,295 | Greenlee | Jan. 10, 1950 |
| 2,589,198 | Monson | Mar. 11, 1952 |
| 2,679,485 | De Groote | May 25, 1954 |
| 2,695,888 | De Groote | Nov. 30, 1954 |